March 29, 1966 V. J. POWERS 3,243,790

AIR BEARING ELECTROMAGNETIC TRANSDUCER HEAD ASSEMBLY

Filed Nov. 13, 1962 2 Sheets-Sheet 1

INVENTOR.
VINCENT J. POWERS

BY
Bower & Patalidis
ATTORNEYS

March 29, 1966 V. J. POWERS 3,243,790

AIR BEARING ELECTROMAGNETIC TRANSDUCER HEAD ASSEMBLY

Filed Nov. 13, 1962 2 Sheets-Sheet 2

INVENTOR.
VINCENT J. POWERS
BY
Bower & Patalidis
ATTORNEYS

United States Patent Office 3,243,790

Patented Mar. 29, 1966

3,243,790

AIR BEARING ELECTROMAGNETIC TRANSDUCER HEAD ASSEMBLY

Vincent J. Powers, South Orange, N.J., assignor to Accurate Bushing Company, Garwood, N.J.

Filed Nov. 13, 1962, Ser. No. 237,036
23 Claims. (Cl. 340—174.1)

The present invention relates in general to new and improved means of mounting a magnetic transducer head in close proximity to a magnetizable record surface, and more particularly to self-aligning electromagnetic transducer heads adapted to be air or gas supported by the laminar flow of fluid clinging to the surface of a rapidly moving record surface.

In the art of recording and reproducing data or information by means of electromagnetic transducer heads mounted in close proximity to a moving magnetizable record surface it is essential to maintain a spacing between the magnetic flux emitting pole pieces of the transducer head and the record surface which is accurate, uniform and as narrow as possible, while preventing actual contact there-between in order to minimize damage to both the transducer head and the record surface.

The air gap must be narrow in order to permit high density recording without cross-talk between adjacent tracks, and in order to provide strong playback characteristics. The air gap must be constant because of the requirement of constant recording and playback levels. Any run-out, wobble or vibration of the moving record surface destroys any attempt at recording high density magnetic data bits where transducer heads are fixedly mounted in such a way that they are prevented from following the irregularities of the record surface.

It is well known that a rapidly moving record surface of the type commonly used in random access magnetic data recording devices, such as magnetic drums and discs, generates a laminar flow of the layer of air or gas clinging to the record surface and set in motion by frictional interaction. The rapidly moving layer of fluid creates a hydrodynamic effect exerting a lifting force that enables a transducer head mounted on an appropriate pad or shoe and subjected to a biasing force in the direction of the record surface to "fly" or float at a predetermined distance from the record surface. The air gap thus created depends from the intensity of the biasing force, the area and shape of the pad or shoe, the velocity of the laminar film of fluid. By varying these factors an equilibrium condition is easily obtainable and controllable.

The present invention contemplates mounting a transducer head in a bearing member which is thus adapted to fly at a predetermined distance from a rapidly moving record surface. The bearing member is resiliently supported by means of a leaf spring which, by auxiliary means forming no part of the present invention, is caused to bias the bearing member toward the record surface as soon as the latter has reached a predetermined velocity which is necessary to create a laminar fluid flow. The bearing member is self-aligning in order to dispense with means adjusting the parallelism between the bearing member surface and the record surface and for enabling the bearing member to follow any irregularity, runout, wobble, etc., of the record surface.

It is therefore an object of the present invention to provide an improved device for positioning an electromagnetic transducer close to, but out of contact from, a rapidly moving record surface.

It is a further object of the present invention to provide an improved device for positioning an electromagnetic transducer close to a moving record surface by utilizing the fluid flow created by the motion of the record surface.

It is another object of the invention to provide an electromagnetic transducer bearing member which is self-adjusting and self-aligning and capable of following any irregularity of the recording surface.

It is an additional object of the invention to provide an electromagnetic transducer bearing member which is independently and universally mounted by means of a spherical self-aligning joint assembly.

Other objects and advantages of the invention will be pointed out in the following description and claims and in the accompanying drawings which illustrate, by way of examples, the principle of the invention and the best modes which have been contemplated of applying that principle.

In the drawings, wherein like numerals refer to like or equivalent elements:

FIGURE 10 is a perspective view of a second modification of the element shown in FIGURE 9.

Figure 3:
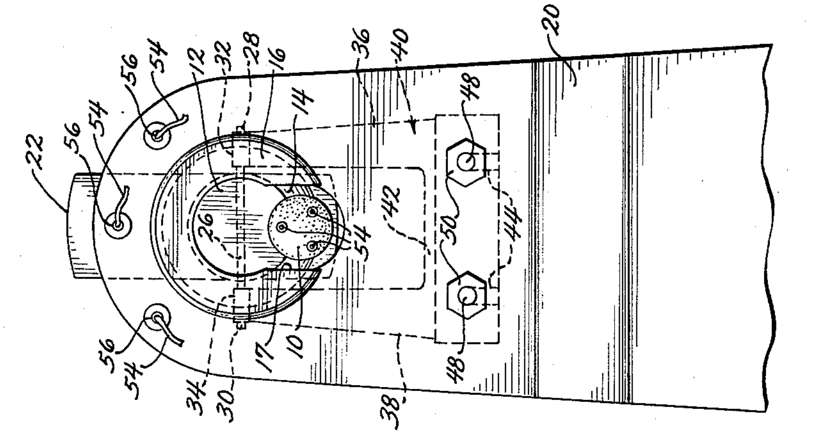
FIGURE 3 is a top plan view of the embodiment illustrated in FIGURES 1 and 2.
Figure 2:
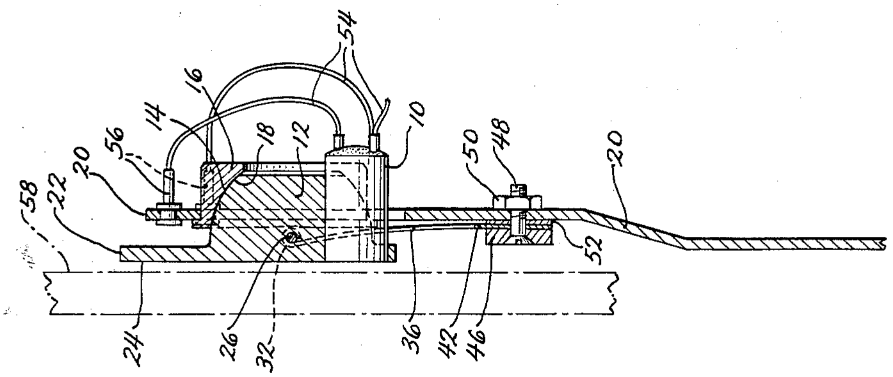
FIGURE 2 is a partial cross-sectional view taken along line 2—2 of FIGURE 1.
Figure 1:
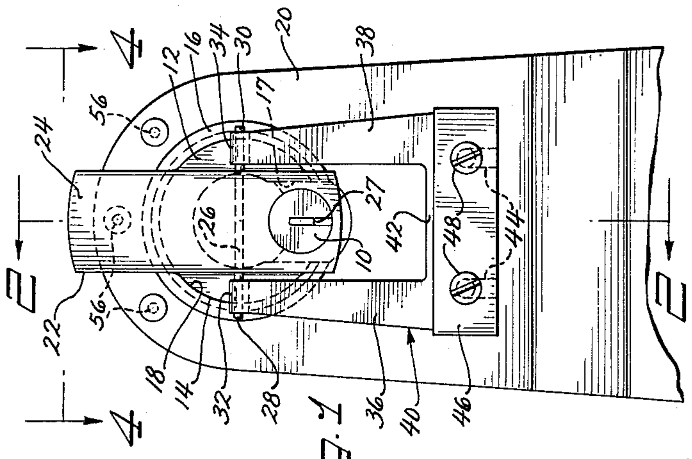
FIGURE 1 is a bottom plan view of one embodiment of the present invention.
Figure 4:
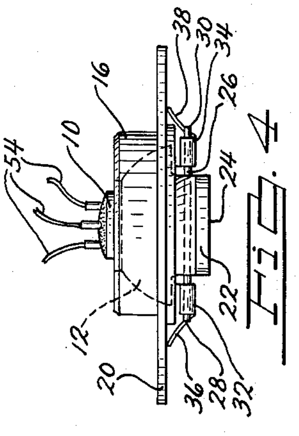
FIGURE 4 is a front elevation view of the embodiment of the invention of FIGURES 1–3, as seen from line 4—4 of FIGURE 1, with electrical connectors omitted for the sake of clarity.
Figure 7:
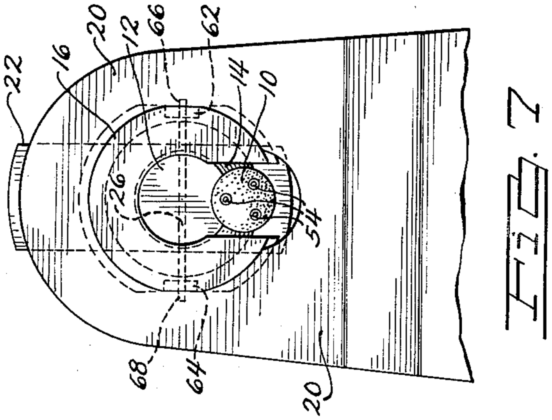
FIGURE 7 is a top plan view of the modification of the invention of FIGURES 5 and 6.
Figure 6:
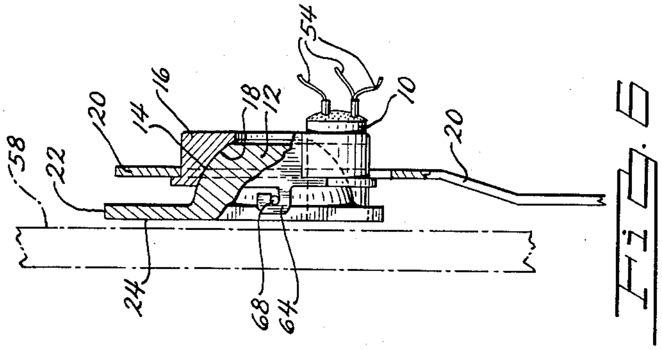
FIGURE 6 is a partial side elevation and cross-sectional view substantially along line 6—6 of FIGURE 5.

Referring now to the drawings and more particularly to FIGURES 1–4 thereof, an electromagnetic transducer assembly according to the invention comprises an electromagnetic transducer head 10 cemented, bonded or otherwise fastened to a substantially hemispherical support member 12 having a convex spherical surface 14 on the periphery thereof. An annular socket member 16, presenting an inner concave spherical surface 18, best seen in FIGURE 2, conforming to the convex spherical surface 14 of the support member 12, is disposed around and above, as shown in the drawings, the support member and is soldered, cemented or otherwise fastened to one end of a resilient flat spring holder 20 having its other end adapted to be fastened to a rigid stationary support member (not shown). The annular socket member 16 has a cut-out portion 17 to clear the body of the electromagnetic transducer head 10. A gliding pad on bearing member 22, integral with or fastened to one side of the support member 12, presents a bearing surface 24 which may be substantially rectangular in plan view, as shown in the drawings by way of example, or which may be of any other appropriate shape. The flux emitting core gap 27 of the transducer head is preferably disposed flush with the bearing surface 24. The bearing surface 24 may advantageously be coated with an unctuous material comprising, for example, ceramics and polytetrafluoroethylene among its constitutive ingredients, and which presents the advantage of preventing damage to the recording surface in the event of accidental contact therewith.

The hemispherical support member 12 is maintained within the annular socket member 16 by means of a diametrically disposed pivot rod 26 substantially at right angle with the longitudinal axis of the transducer head assembly and which is press-fitted in the support member 12 or immobilized therein by means of a set screw (not shown). Two journal end portions 28 and 30 protruding from the body of the support member are within the bearing portions 32 and 34 formed on the ends of arms 36 and 38 of a U-shaped member 40 made of spring material. The bridge portion 42 joining the two arm portions of the spring member 40 is provided with slots 44 for fastening to the flat spring holder 20 by means of the clamping block 46 and the screws 48 and nuts 50. A shim insert 52 acts as a spacer between the bridge portion 42 of the spring member 40 and the flat spring holder 20.

The U-shaped spring member 40 is shown in the drawings as being made of flat spring material. It is evident that it could, alternately, be made of substantially straight spring wire, bent to the appropriate configuration and provided with bent journal ends introduced through a cylindrical diametral bearing member disposed through the body of the support member.

The arms 36–38 of the spring member 40 exert a biasing action upon the journal end portions 28–30 of the pivot rod 26 in such a way as to cause a force firmly applying the convex spherical surface 14 of the support member 12 in contact with the concave spherical surface 18 of the annular socket member 16.

The electromagnetic transducer head 10 has wires 54 for connection of its coil (not shown) to read or write amplifiers, or to erase oscillators, according to the function of the electro-magnetic transducer. Wires 54 may be connected to terminals such as 56 carried by, but insulated from, the leaf spring holder 20 for electrical connection to the above-mentioned associated equipment.

The transducer head assembly of the invention is normally mounted by being clamped at the free end of the flat spring holder 20 in a mounting member (not shown) in such a way as to cause the bearing surface 24 of the gliding pad 22 to be approximately parallel to the record surface 58 on which information is to be recorded and from which information is to be read. The bearing surface 24 is normally a certain distance away from the record surface when the latter is at rest. When the record surface is in motion, a laminar film of gas fluid clinging to the record surface is caused to move at approximately the same velocity as the velocity of translation of the record surface. The spring member 22 is then bent by a mechanism, which forms no part of the present invention, in the direction which tends to decrease the distance separating the bearing surface 24 from the record surface. The bearing surface 24 is thus forced to occupy a predetermined position away from the record surface, being there supported by the fluid bearing developed by the motion of the laminar film of gas. The bearing surface 24 automatically aligns itself substantially parallel to the record surface, and, due to the ball and socket connection between the support member 12 and the annular socket member 16, combined with the resilient action of the spring member 20, the bearing surface 24 and consequently the flux emitting gap 26 are capable of following all the irregularities, out of roundness or wobbles of the recording surface.

The modification of the invention represented by FIGURES 5–8 also comprises an electromagnetic transducer head 10 mounted in a hemispherical support member 12 set in an annular socket member 16 which is in turn supported on the end of a leaf spring holder 20. A gliding pad or bearing member 22 with a bearing surface 24 is adapted to be supported by the laminar flow of fluid set in motion by a moving record surface 58. These elements are similar to, and fulfill the same functions as, the corresponding elements in the embodiment of FIGURES 1–4. The sole difference between this embodiment and the embodiment precedently described is in the manner in which the hemispherical support member 12 is mounted with its convex spherical surface 14 in contact with the inner concave spherical surface 18 of the annular socket member 16. A rod 26, made of spring material, is diametrically disposed through the body of the support member 12, perpendicularly to the longitudinal axis of the assembly. The annular socket member 16 presents bearing members 62 and 64 through which project the journal ends 66 and 68 of the rod 26. The rod 26 is normally slightly flexed in order to create a biasing force applying the convex spherical surface 14 of the support member 12 against the concave spherical surface 18 of the annular socket member 16. The support member 12 is thus mounted within the annular socket member 16 in rigorous alignment, but is still capable of free rocking motion by means of the journal ends 66–68 of the rod 26 pivoting in the stationary bearing members 62–64, and the support member is further also capable of limited lateral tilting motion, due to the resiliency of the rod 26.

Figure 9:
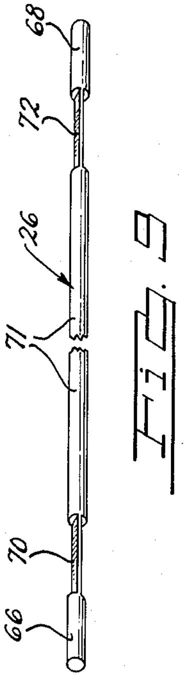
FIGURE 9 is a perspective view of a first modification of an element of the embodiment of FIGURES 5–8.
Figure 5:
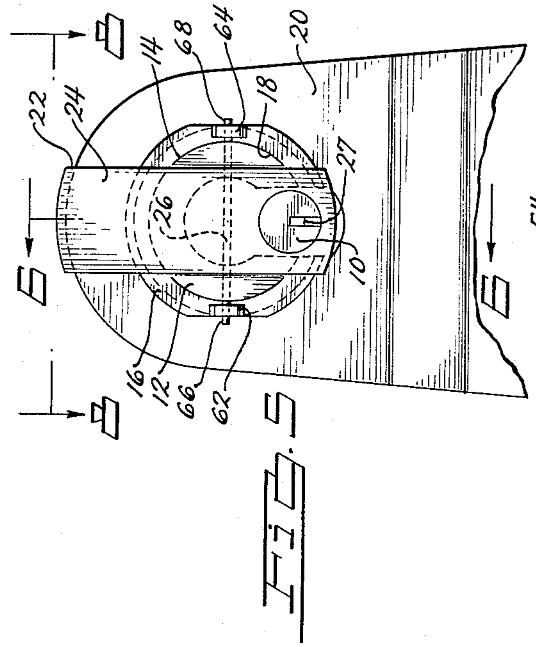
FIGURE 5 is a bottom plan view of a modification of the invention.
Figure 8:
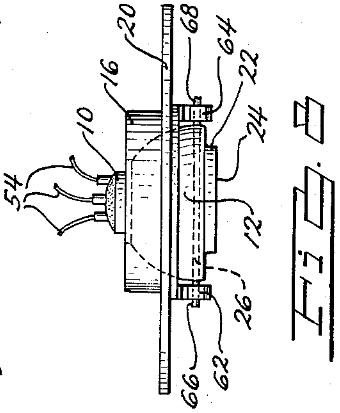
FIGURE 8 is a front elevation view of the same modification as seen from line 8—8 of FIGURE 5.

FIGURE 9 represents a modification of the rod 26 consisting of symmetrically disposed integral flattened portions 70 and 72 joining the body of the rod 71, normally secured fixedly through the body of the support member, with the journal ends 66 and 68. This modification increases the flexibility of the rod 26 and consequently permits improved lateral tilting of the hemispherical support member 12 in relation to the annular socket member 16.

Figure 10:
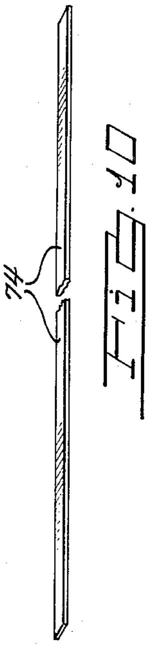
FIGURE 10 is a perspective view of a second modification of an element of the embodiment of FIGURES 5–8.

FIGURE 10 represents a flat spring member 74 which may be used instead of the rod 26 precedently described. When the flat spring 74 is used to maintain the support member 12 within the annular socket member 16, any longitudinal rocking motion of the support member in relation to the annular socket member causes the flat spring 74 to operate in torsion, because the two end portions of the flat spring are fixedly clamped in members 62 and 64, thereby resulting in a torque which tends to bring the support member back to its neutral substantially centered position.

It is to be noted that, in both examples of the invention, the transducer head 10 is preferably mounted on the support member 12 with its flux emitting gap 27 proximate the trailing edge of the bearing surface 24, and that the pivot center of the support member does not coincide with the geometric center of the bearing surface 24 but is preferably slightly rearward thereof. Such an arrangement affords better bearing or gliding characteristics by providing a bearing surface which is self-stabilizing at a very slight positive incidence or angle of attack in relation to the record surface. The transducer head, being positioned close to the trailing edge of the bearing surface, has consequently its magnetic gap at a point of substantially minimum distance between the bearing surface and the record surface, thus providing the optimum conditions for best recording and playback functions.

Although the bearing surface 24 has been represented as a flat surface and could actually be made as such, it has been found that a slightly convex surface has some advantages in obtaining better gliding characteristics for a transducer assembly coacting with a flat-surfaced record medium. A flat-surfaced or a slightly concave-surfaced bearing surface can be used to coact with a cylindrical record medium such as a magnetic drum.

The hemispherical support member and the annular socket member may be made of similar or dissimilar materials which may be metals, alloys, or plastics. In some applications it has been found advantageous to coat either the convex surface 14 of the support member or the concave surface 18 of the annular socket member, or both, with a composition having dry lubricant qualities, such as polytetrafluoroethylene.

A particular advantage of the invention resides in the fact that the convex surface 14 is a portion of a sphere whose center can be disposed very close to the bearing surface 24 of the bearing member 22, or, better yet, the imaginary center of the sphere may actually be, by design, located upon the bearing surface. Furthermore, the electromagnetic transducer head 10 may also be supported by the support member 12 with its flux emitting gap 27 disposed in such a way as to coincide with the imaginary center of the sphere. Consequently, the flux emitting gap may be caused to remain in a substantially fixed location, irrespective of any tilting, rocking or swinging motion of the support member 12 relatively to the socket member 16. This results in a perfect alignment of the electromagnetic transducer flux emitting gap with the appropriate track on the record surface, in spite of any run-out, wobble or vibration of the latter.

While there has been shown and described and pointed out the fundamental novel features of the invention as applied to the preferred embodiments, it will be understood that various omissions and changes and substitutions in the form and details of the devices illustrated may be made by those skilled in the art without departing from the spirit and scope of the invention. Consequently, the invention herein disclosed is to be construed as limited only by the spirit and scope of the appended claims.

What is new is:

1. Apparatus for supporting an electromagnetic transducer head at a predetermined distance away from a moving magnetizable surface by utilizing the bearing fluid set in motion by the movement of said magnetizable surface, said apparatus comprising:
- said electromagnetic transducer head;
- a support member for said transducer head, said support member having on one side a bearing surface adapted to be supported by said bearing fluid;
- a partial spherical convex surface on the periphery of the other side of said support member;
- a socket member having an inner partial spherical concave surface adapted to receive said convex surface;
- means holding said support member within said socket member with the convex surface of said support member in continuous engagement with the concave surface of said socket member while permitting limited two axes free motion of said support member relatively to said socket member and maintaining said support and socket members substantially longitudinally aligned; and
- a resilient flat spring holder having one end fastened to said socket member and another end adpated to be fixedly supported.

2. The apparatus of claim 1 wherein the bearing surface is coated with an unctuous plastic material.

3. The apparatus of claim 1 wherein the bearing surface is flat.

4. The apparatus of claim 1 wherein the bearing surface is convex.

5. The apparatus of claim 1 wherein the bearing surface is concave.

6. The apparatus of claim 1 wherein the magnetic transducer head is supported proximate the trailing edge of said bearing surface.

7. The apparatus of claim 1 wherein the means holding the support member within the annular socket member comprises:
- a rod member diametrically disposed through said support member perpendicularly to the longitudinal axis of said apparatus and having journal end portions projecting from the body of said support member;
- bearing members for said journal portions;
- each of said bearing members being on one end of a flexible arm member having its other end affixed to said resilient flat spring holder;
- and both said flexible arm members having a predetermined biasing action causing the support member to be maintained with its convex surface in sliding contact with the concave surface of the annular socket member.

8. The apparatus of claim 1 wherein the means holding the support member within the annular socket member comprises:
- a flexible rod member diametrically disposed through said support member perpendicularly to the longitudinal axis of said apparatus and having journel end portions projecting from the body of said support member;
- bearing members for said journal portions;
- said bearing members being affixed to said annular socket member;
- and said flexible rod member permitting said support member to freely rock longitudinally in relation to said annular socket member while allowing a substantially lesser degree of free lateral tilting by deflection of said journal end portions from normal relaxed position.

9. Apparatus for supporting an electromagnetic transducer head at a predetermined distance away from a moving magnetizable surface by utilizing the bearing fluid set in motion by the movement of said magnetizable surface, said apparatus comprising:
- said electromagnetic transducer head;
- a support member for said transducer head;
- a bearing surface dependent from said support member and adapted to be supported by said bearing fluid, said transducer head having flux emitting pole pieces substantially flush with said bearing surface;
- a substantially hemispherical convex surface on the periphery of said support member diametrically opposed to said bearing surface;
- an annular socket member having an inner hemispherical concave surface conforming to and adapted to receive the hemispherical convex surface on the periphery of the support member for universal joint-like motion of said support member in relation therewith;
- resilient means holding at all times said support member within said annular member with their respective hemispherical convex and concave surfaces in contact;
- and a resilient flat spring holder having one end fastened to said socket member and another end adapted to be fixedly supported.

10. The apparatus of claim 9 wherein the bearing surface is coated with an unctuous plastic material.

11. The apparatus of claim 9 wherein the bearing surface is disc-shaped in plan view.

12. The apparatus of claim 9 wherein the bearing surface is flat.

13. The apparatus of claim 9 wherein the bearing surface is convex.

14. The apparatus of claim 9 wherein the bearing surface is concave.

15. The apparatus of claim 9 wherein the magnetic transducer head is supported proximate the trailing edge of said bearing surface.

16. The apparatus of claim 9 wherein at least one of the surfaces of contact between the support member and the annular socket member is coated with an unctuous dry material.

17. The apparatus of claim 9 wherein the resilient means holding said support member within said annular socket member comprises:
- a rod member diametrically disposed through said support member perpendicularly to the longitudinal axis of said apparatus and having journal end portions projecting from the body of said support member;
- bearing members for said journal portions;
- each of said bearing members being on one end of a flexible arm member having its other end affixed to said resilient flat spring holder;
- and both said flexible arm members having a predetermined biasing action causing the support member to be maintained with its convex surface in sliding contact with the concave surface of the annular socket socket member;

18. The apparatus of claim 17 wherein said flexible arm member is a flat leaf spring.

19. The apparatus of claim 9 wherein the resilient means holding said support member within said annular socket member comprises:

a flexible rod member diametrically disposed through said support member perpendicularly to the longitudinal axis of said apparatus and having journal end portions projecting from the body of said support member;

bearing members for said journal portions;

said bearing members being affixed to said annular socket member;

and said flexible rod member permitting said support member to freely rock longitudinally in relation to said annular socket member while allowing a substantially lesser degree of free lateral tilting by deflection of said journal end portions from normal relaxed position.

20. The apparatus of claim 19 wherein said flexible rod member has a cylindrical body portion having in turn cylindrical end journal portions separated from said body portion by integral flat portions.

21. The apparatus of claim 9 wherein the resilient means holding said support member within said annular socket member is:

a flat slender flexible bar diametrically fixedly disposed through said support member perpendicularly to the longitudinal axis of said apparatus and having ends projecting from the body of said support member;

clamping members dependent from said annular socket member and securedly immobilizing said ends;

and said flexible bar operating in torsion to permit said support member to rock longitudinally in relation to said annular socket member and in flexion to permit lateral tilting therebetween, and deflection from preestablished setting tending to cause a force bringing said support member to a preestablished neutral position in relation to said annular socket member.

22. The apparatus of claim 1 wherein the flux emitting pole pieces of the electromagnetic transducer head define a flux emitting gap coinciding with the center of a sphere defined by the convex and concave surfaces respectively on the support and the socket members.

23. The apparatus of claim 9 wherein the flux emitting pole pieces of the electromagnetic transducer head define a flux emitting gap coinciding with the center of a sphere defined by the convex and concave surfaces respectively on the support and the socket members.

References Cited by the Examiner

UNITED STATES PATENTS

| | | | |
|---|---|---|---|
| 2,886,651 | 5/1959 | Vogel | 340—174.1 |
| 2,937,240 | 5/1960 | Harker | 340—174.1 |
| 3,018,152 | 1/1962 | Cowan | 340—174.1 |
| 3,065,460 | 11/1962 | Altenan et al. | 340—174.1 |
| 3,072,752 | 1/1963 | Charnetsky et al. | 340—174.1 |
| 3,170,149 | 2/1965 | Koskie et al. | 340—174.1 |

FOREIGN PATENTS

| | | |
|---|---|---|
| 1,258,021 | 2/1961 | France. |

BERNARD KONICK, *Primary Examiner.*

IRVING L. SRAGOW, *Examiner.*

R. M. JENNINGS, A. I. NEUSTADT, *Assistant Examiners.*